(12) United States Patent
Peng et al.

(10) Patent No.: US 10,988,347 B2
(45) Date of Patent: Apr. 27, 2021

(54) LARGE-TONNAGE COAL DROPPING BUFFER SKIP FOR MINE

(71) Applicants: China University of Mining and Technology, Jiangsu (CN); XUZHOU COAL MINE SAFETY EQUIPMENT MANUFACTURE CO., LTD., Jiangsu (CN)

(72) Inventors: Yuxing Peng, Jiangsu (CN); Zhencai Zhu, Jiangsu (CN); Gongbo Zhou, Jiangsu (CN); Changhua Hu, Jiangsu (CN); Qingyong Du, Jiangsu (CN); Hao Lu, Jiangsu (CN); Guohua Cao, Jiangsu (CN); Songyong Liu, Jiangsu (CN); Gang Shen, Jiangsu (CN)

(73) Assignees: China University of Mining and Technology, Jiangsu (CN); XUZHOU COAL MINE SAFETY EQUIPMENT MANUFACTURE CO., LTD., Jiangsu (CN)

( * ) Notice: Subject to any disclaimer, the term of this patent is extended or adjusted under 35 U.S.C. 154(b) by 0 days.

(21) Appl. No.: 16/955,787

(22) PCT Filed: Sep. 4, 2019

(86) PCT No.: PCT/CN2019/104267
§ 371 (c)(1),
(2) Date: Jun. 19, 2020

(87) PCT Pub. No.: WO2020/057366
PCT Pub. Date: Mar. 26, 2020

(65) Prior Publication Data
US 2020/0339388 A1 Oct. 29, 2020

(30) Foreign Application Priority Data
Sep. 20, 2018 (CN) .......................... 201811101517.4

(51) Int. Cl.
*B66B 17/08* (2006.01)
*B66B 17/00* (2006.01)
(Continued)

(52) U.S. Cl.
CPC .............. *B66B 17/08* (2013.01); *B66B 17/00* (2013.01); *B66B 17/26* (2013.01); *F16F 3/02* (2013.01);
(Continued)

(58) Field of Classification Search
CPC ........... B66B 17/26; B66B 7/02; B66B 17/08; B66B 17/00; F16F 3/02; F16F 15/06; F16F 2224/0208; F16F 2236/04
See application file for complete search history.

(56) References Cited

U.S. PATENT DOCUMENTS 3,378,153 A * 4/1968 Domenighetti ........... B66B 9/06
414/598
4,932,427 A * 6/1990 Yamada ............. B65G 49/0459
134/66
(Continued)

FOREIGN PATENT DOCUMENTS

CN 203602197 5/2014
CN 106122334 11/2016
(Continued)

OTHER PUBLICATIONS

"International Search Report (Form PCT/ISA/210) of PCT/CN2019/104267" dated Dec. 2, 2019, with English translation thereof, pp. 1-8.

*Primary Examiner* — Jeffrey Donels
(74) *Attorney, Agent, or Firm* — JCIPRNET

(57) ABSTRACT

A large-tonnage coal dropping buffer skip for a mine is disclosed. A loading skip box (14) is installed at the top of a large-tonnage skip (12), a coal dropping buffer device (13)
(Continued)

is arranged on the inner sidewall of the large-tonnage skip (12), and the coal dropping buffer device (13) includes: a frame (1) fixedly connected with the inner sidewall of the large-tonnage skip (12); a lining plate guide frame (6) connected with the frame (1) through shock absorbers (2), guide sliding grooves being formed in the lining plate guide frame (6); a lining plate support (4) slidably nested in the guide sliding grooves in the lining plate guide frame (6), hoisting lugs (9) for hoisting being arranged at the top end of the lining plate support (4); and a lining plate (5) detachably connected with the lining plate support (4) through fasteners (7).

7 Claims, 6 Drawing Sheets

(51) Int. Cl.
*B66B 17/26* (2006.01)
*F16F 3/02* (2006.01)
*F16F 15/06* (2006.01)

(52) U.S. Cl.
CPC ...... *F16F 15/06* (2013.01); *F16F 2224/0208* (2013.01); *F16F 2236/04* (2013.01)

(56) References Cited

U.S. PATENT DOCUMENTS

| | | | | |
|---|---|---|---|---|
| 5,765,662 | A | * | 6/1998 | Mellen .................... B66B 17/06 187/245 |
| 6,174,013 | B1 | * | 1/2001 | Nicholl .................. B60R 13/01 105/423 |
| 10,053,292 | B2 | * | 8/2018 | Werre ..................... B65G 47/58 |
| 2014/0110194 | A1 | * | 4/2014 | Zhu ......................... B66B 17/04 187/254 |
| 2018/0065811 | A1 | * | 3/2018 | Chen ...................... B65G 15/22 |
| 2020/0407196 | A1 | * | 12/2020 | Peng ....................... G01L 5/0052 |

FOREIGN PATENT DOCUMENTS

| | | |
|---|---|---|
| CN | 106185576 | 12/2016 |
| CN | 106276200 | 1/2017 |
| CN | 109160410 | 1/2019 |
| GB | 259305 | 10/1926 |

* cited by examiner

LARGE-TONNAGE COAL DROPPING BUFFER SKIP FOR MINE

CROSS-REFERENCE TO RELATED APPLICATION

This application is a 371 of international application of PCT application serial no. PCT/CN2019/104267, filed on Sep. 4, 2019, which claims the priority benefit of China application no. 201811101517.4, filed on Sep. 20, 2018. The entirety of each of the above mentioned patent applications is hereby incorporated by reference herein and made a part of this specification.

FIELD OF THE INVENTION

The present invention relates to a large-tonnage coal dropping buffer skip for a mine, which is suitable for coal loading and dropping buffer and shock absorption of a large-tonnage skip, and can facilitate the removal and replacement of a coal dropping buffer device.

DESCRIPTION OF RELATED ART

Skip is the main equipment for hoisting coal and other mineral resources in mines, and is used to complete the hoisting transportation of coal and other mineral resources from underground to ground. With the large-scale development of mines, the hoisted load of a mine hoisting skip increases, and the safety and reliability of the large-tonnage skip directly affect the safety of mine hoisting transportation. Under the actual hoisting condition, the sidewall and bottom lining plates of the large-tonnage skip bear the direct impact friction of coal blocks, gangues and other minerals, the applied load and working condition are extremely bad, which aggravate the abrasion of the lining plates and seriously reduce the service life of the skip.

In daily production, the lining plates of the large-tonnage hoisting skip for the mine are frequently repaired and replaced due to the damage caused by impact. At present, the lining plates of the large-tonnage skip which is widely used in the mine are often directly and fixedly welded to the sidewall of the skip. The frequent repair and replacement of the lining plates will inevitably cause the hoisting skip to be discarded and shut down, wasting a lot of material and financial resources, and directly affecting the mining efficiency of the mine.

SUMMARY OF THE INVENTION

The purpose of the present invention is to provide a novel large-tonnage coal dropping buffer skip which is simple in structure and is safe and convenient to operate, aiming at overcoming the defects in the prior art.

The purpose of the present invention is realized by adopting the following technical solution:
A large-tonnage coal dropping buffer skip for a mine comprises a large-tonnage skip, a loading skip box is installed at the top of the large-tonnage skip, at least one coal dropping buffer device is arranged on the inner sidewall of the large-tonnage skip, and each coal dropping buffer device comprises:
a frame fixedly connected with the inner sidewall of the large-tonnage skip;
a lining plate guide frame connected with the frame through shock absorbers, guide sliding grooves being formed in the lining plate guide frame;
a lining plate support slidably nested in the guide sliding grooves in the lining plate guide frame, hoisting lugs for hoisting being arranged at the top end of the lining plate support; and
a lining plate detachably connected with the lining plate support through fasteners.

The number of the coal dropping buffer devices is at least two, one coal dropping buffer device is located on the inner sidewall opposite to the side of the discharge outlet of the loading skip box in the large-tonnage skip, and the other coal dropping buffer device is located at a dropped coal landing position at the inner bottom of the large-tonnage skip.

The frame comprises a horizontal plate and a vertical plate which are fixedly connected, the upper and lower ends of the vertical plate are fixedly connected with the hoisting skip through fasteners, respectively, a rib plate for reinforcing the strength of the frame is arranged at a connecting position between the horizontal plate and the vertical plate.

The shock absorbers are steel wire rope shock absorbers, the number of the steel wire rope shock absorbers is three, two steel wire rope shock absorbers are vertically and symmetrically arranged on the left and right sides of the vertical plate between the vertical plate and the lining plate guide frame, and the other steel wire rope shock absorber is horizontally arranged between the horizontal plate and the bottom of the lining plate guide frame.

Inwards concave guide sliding grooves are formed in the two sides of the front of the lining plate guide frame, and the guide sliding grooves are configured to provide rails for upward and downward movement of the lining plate support.

The lining plate support comprises an L-shaped structural plate and an upper horizontal plate at the upper part of the L-shaped structural plate, and a plurality of first threaded holes are formed in the upper horizontal plate at equal intervals;
second threaded holes are formed in the top end of the lining plate at positions corresponding to the first threaded holes in the upper horizontal plate;
the fasteners are bolts, and the thread ends of the bolts sequentially penetrate through the first threaded holes and the second threaded holes to fixedly connect the lining plate and the lining plate support.

Compression springs for preventing loosening are inserted between the nut ends of the bolts and the upper horizontal plate of the lining plate support.

The present invention innovatively designs a large-tonnage coal dropping buffer skip for a mine in combination with steel wire rope shock absorbers, which has the following beneficial effects:
(1) Compared with the prior art, the present invention, in combination with the coal loading and dropping condition of the large-tonnage skip, proposes to use the steel wire rope shock absorbers to connect the lining plate to achieve the effect of shock absorption and buffer, so as to enable the large-tonnage hoisting skip to be more stable during loading; the rigidity coefficient of the steel wire rope shock absorbers is a non-fixed value, the rigidity coefficient increases with the increase of the horizontal shock, and the buffer effect of the steel wire rope shock absorbers under a great horizontal shock is very obvious. The present invention makes full use of the excellent shock isolation and impact resistance of the steel wire rope shock absorbers, and designs a skip which can effectively alleviate the impact abrasion damage of the skip lining plate caused by coal dropping impact during loading of the large-tonnage skip, the service life of the large-tonnage skip is prolonged, and the production efficiency of the coal mine is improved.

(2) The coal dropping buffer devices can effectively alleviate the impact abrasion damage of the skip lining plate under the coal dropping and loading condition, the quick removal and replacement of the damaged lining plate can be realized at the same time, the service life of the skip is prolonged and the production efficiency of the coal mine is improved.

(3) The coal dropping buffer devices in the present invention have the advantages of simple structure, suitable size and convenience in assembling.

(4) The coal dropping buffer devices in the present invention can be flexibly installed and arranged on the sidewall, bottom and other heavy-load impact positions of the hoisting skip, and are convenient to install and disassemble.

BRIEF DESCRIPTION OF THE DRAWINGS

Specific implementations of the present invention are further described in detail below with reference to the accompanying drawings, where.

Figure 1:
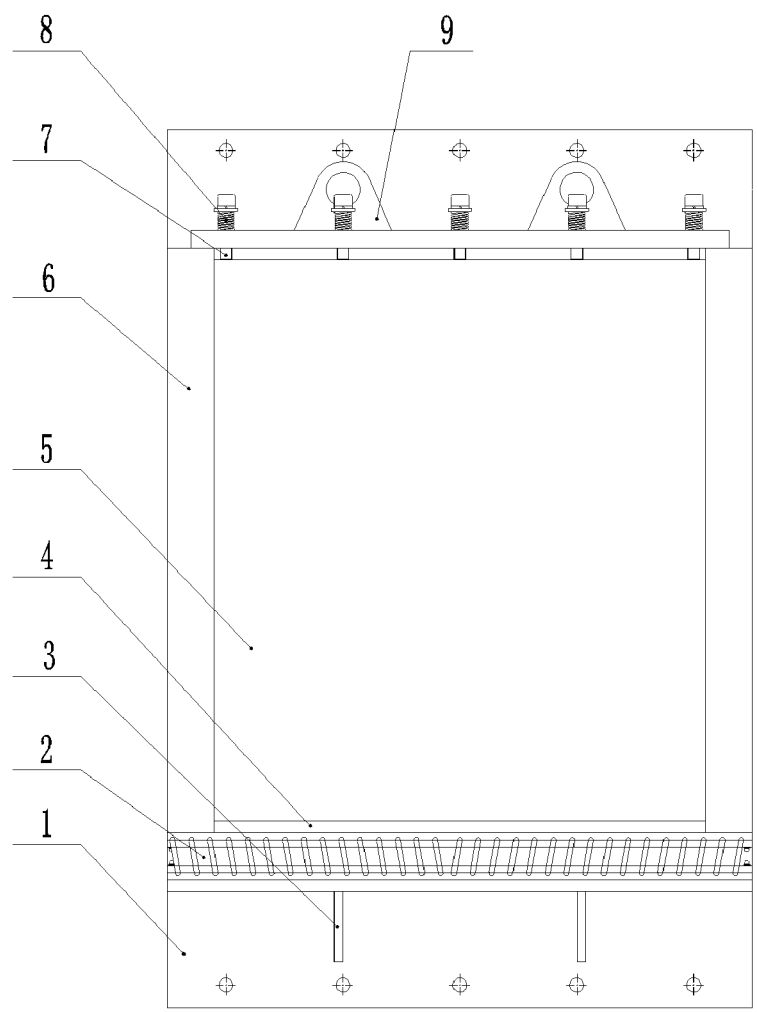
FIG. 1 is a front schematic view of a coal dropping buffer device of a large-tonnage coal dropping buffer skip according to the present invention.

In the drawings, 1—frame; (2, 10)—steel wire rope damper; 3—rib plate; 4—lining plate support; 5—lining plate; 6—lining plate guide frame; 7—bolt; 8—compression spring; 9—hoisting lug; 12—large-tonnage skip; 13—coal dropping buffer device; 14—loading skip box.

DETAILED DESCRIPTION OF THE INVENTION

The following describes the present invention in detail with reference to specific embodiments.

Embodiment 1

As illustrated in FIG. 1 to FIG. 7, large-tonnage coal dropping buffer skip for a mine comprises a loading skip box 14, a large-tonnage skip 12 and coal dropping buffer devices 13. The coal dropping buffer devices 13 are fixed on the sidewalls of the large-tonnage skip 12 and at a dropped coal landing position at the bottom. Each coal dropping buffer device 13 mainly consists of a frame 1, steel wire rope shock absorbers 2, a lining plate support 4, a lining plate 5, a lining plate guide frame 6, bolts 7, compression springs 8, and hoisting lugs 9.

The lining plate guide frame 6 is fixedly connected with the frame 1 through the steel wire rope shock absorbers 2, the lining plate support 4 is slidably nested in the grooves in the lining plate guide frame 6, the lining plate 5 is clamped and tightly fixed in the lining plate support 4 through the bolts 7, and the hoisting lugs 9 are welded at the upper end of the lining plate support 4.

Figure 8:
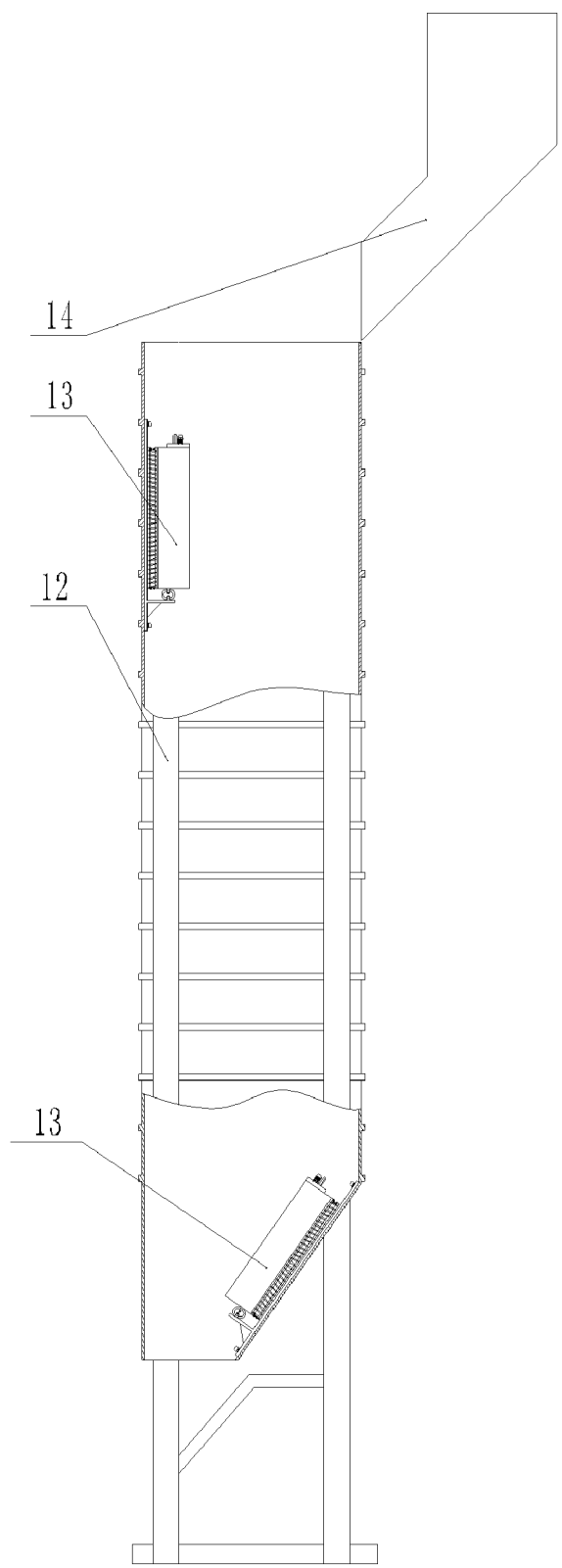
FIG. 8 is an installation schematic view of coal dropping buffer devices on the left sidewall and bottom of a large-tonnage coal dropping buffer skip according to the present invention.

As illustrated in FIG. 8 to FIG. 9, the number of the coal dropping buffer devices 13 is two, one coal dropping buffer device 13 is fixed on the sidewall of the large-tonnage skip 12 through the bolts, and the other coal dropping buffer device 13 is fixed at a dropped coal landing position at the inner bottom of the large-tonnage skip, so as to buffer the impact of large-particle dropped coal to the sidewalls and the bottom of the large-tonnage skip 12, improve the loading stability of the large-tonnage skip 12, alleviate the damage to the large-tonnage skip 12 and prolong the service life of the large-tonnage skip 12.

Figure 2:
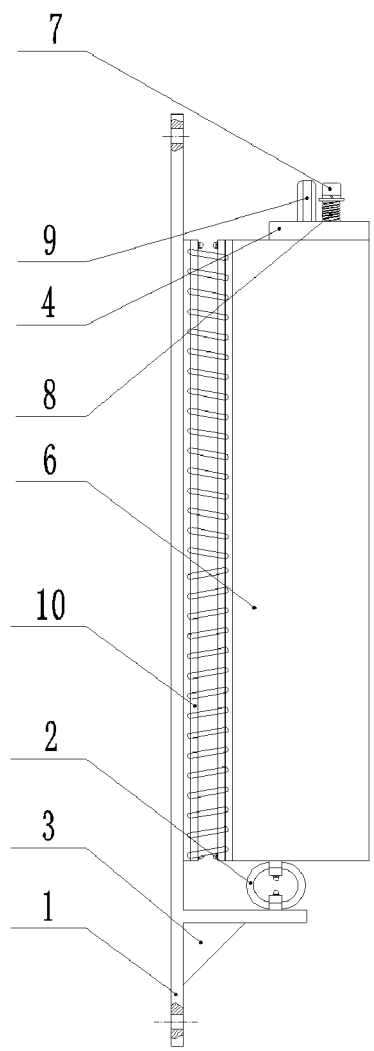
FIG. 2 is a left schematic view of a coal dropping buffer device of a large-tonnage coal dropping buffer skip according to the present invention.
Figure 3:
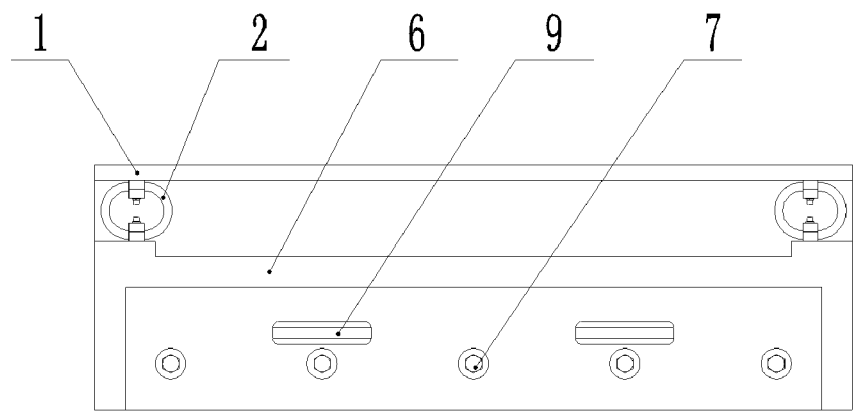
FIG. 3 is a top schematic view of a coal dropping buffer device of a large-tonnage coal dropping buffer skip according to the present invention.

As illustrated in FIG. 1 to FIG. 3, the frame 1 mainly consists of a horizontal plate and a vertical plate which are vertically welded. A rib plate 3 is welded at a connecting position below the horizontal plate and the vertical plate and is configured to reinforce the strength of the frame 1. Through holes are respectively formed in the upper and lower ends of the vertical plate of the frame 1 and are configured to fix the frame 1 with the large-tonnage skip.

As illustrated in FIG. 1 to FIG. 3, in Embodiment 1 of the present invention, one ends of the steel wire rope shock absorbers 2 are respectively fixed on the left and right sides of the vertical plate and the upper side of the horizontal plate of the frame 1 through the bolts, and the other ends are correspondingly and tightly fixed on the left and right sides and the lower side of the rear end of the lining plate guide frame 6.

Figure 4:
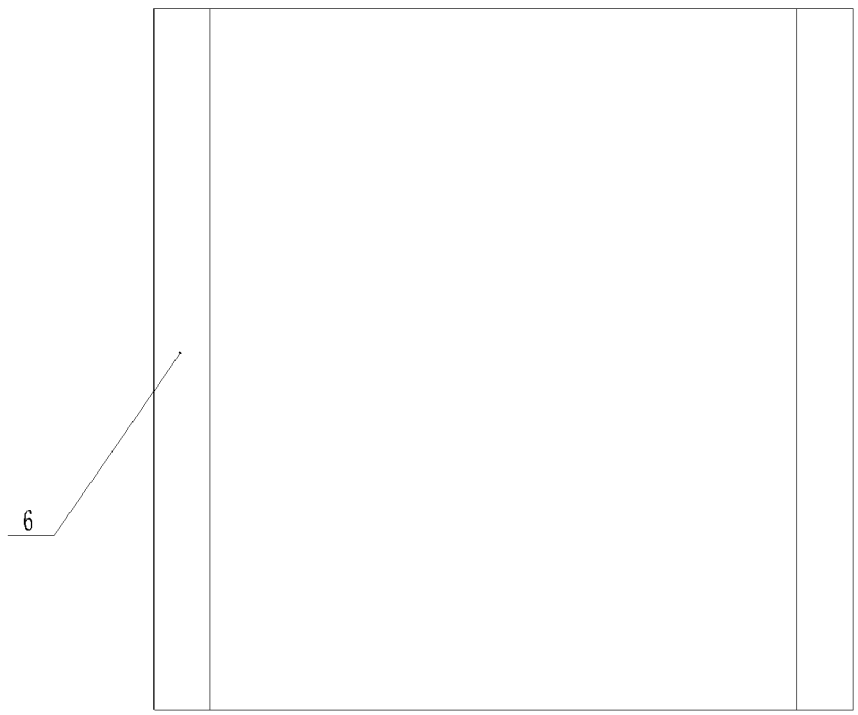
FIG. 4 is a front view of a lining plate guide frame in a coal dropping buffer device of a large-tonnage coal dropping buffer skip according to the present invention.
Figure 5:
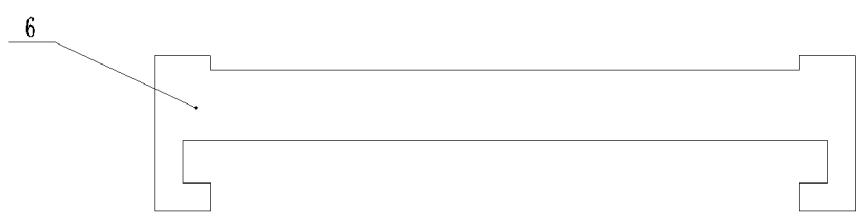
FIG. 5 is a top view of a lining plate guide frame in a coal dropping buffer device of a large-tonnage coal dropping buffer skip according to the present invention.

As illustrated in FIG. 4 to FIG. 5, concave sliding grooves are formed in the two sides of the front of the lining plate guide frame 6 and are configured to provide rails for upward and downward movement of the lining plate support 4.

Figure 6:
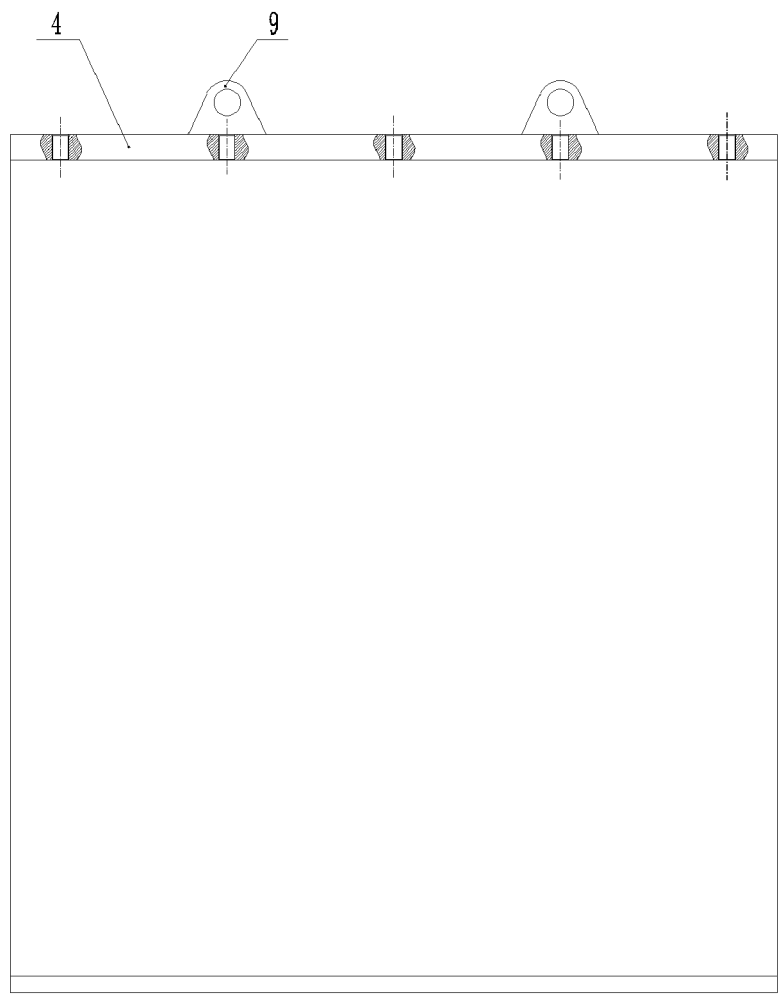
FIG. 6 is a front view of a lining plate support in a coal dropping buffer device of a large-tonnage coal dropping buffer skip according to the present invention.
Figure 7:
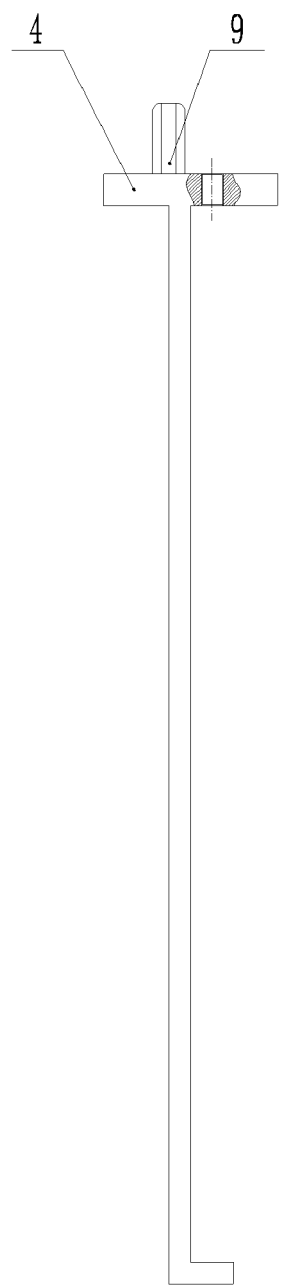
FIG. 7 is a left view of a lining plate support in a coal dropping buffer device of a large-tonnage coal dropping buffer skip according to the present invention.

As illustrated in FIG. 6 to FIG. 7, in Embodiment 1, the lining plate support 4 mainly consists of an L-shaped structural plate and an upper horizontal plate which are welded together. Five threaded holes are formed in the upper horizontal plate of the lining plate support 4. Two hoisting lugs 9 are symmetrically fixed on the upper end of the upper horizontal plate and are configured to hoist and disassemble the lining plate support 4.

When in use, the coal dropping buffer devices 13 in the present invention are fixed on the sidewalls of the large-tonnage skip 12 and the dropped coal landing position at the bottom. If the lining plate 5 is damaged due to impact, the lining plate support 4 can be hoisted out of the concave sliding grooves in the lining plate guide frame 6 by using the hoisting lugs 9, and the bolts 7 are loosened to complete the installation and replacement of the lining plate 5.

The above descriptions are only preferred embodiments of the present invention. It should be noted that a person of ordinary skill in the art may make various improvements and modifications without departing from the principles of the present invention, and such improvements and modifications shall all fall within the protection scope of the present invention.

What is claimed is:

1. A large-tonnage coal dropping buffer skip for a mine, comprising a large-tonnage skip, a loading skip box being installed at a top of the large-tonnage skip, at least one coal dropping buffer device being arranged on an inner sidewall of the large-tonnage skip, wherein each coal dropping buffer device comprises:
- a frame fixedly connected with the inner sidewall of the large-tonnage skip;
- a lining plate guide frame connected with the frame through shock absorbers, guide sliding grooves being formed in the lining plate guide frame;
- a lining plate support slidably nested in the guide sliding grooves in the lining plate guide frame, hoisting lugs for hoisting being arranged at a top end of the lining plate support; and
- a lining plate detachably connected with the lining plate support through fasteners.

2. The large-tonnage coal dropping buffer skip for the mine according to claim 1, wherein a number of the coal dropping buffer devices is at least two, one coal dropping buffer device is located on an inner sidewall opposite to a side of a discharge outlet of the loading skip box in the large-tonnage skip, and the other coal dropping buffer device is located at a dropped coal landing position at an inner bottom of the large-tonnage skip.

3. The large-tonnage coal dropping buffer skip for the mine according to claim 1, wherein the frame comprises a horizontal plate and a vertical plate which are fixedly connected, upper and lower ends of the vertical plate are fixedly connected with a hoisting skip through fasteners, respectively, a rib plate for reinforcing a strength of the frame is arranged at a connecting position between the horizontal plate and the vertical plate.

4. The large-tonnage coal dropping buffer skip for the mine according to claim 3, wherein the shock absorbers are steel wire rope shock absorbers, a number of the steel wire rope shock absorbers is three, two steel wire rope shock absorbers are vertically and symmetrically arranged on left and right sides of the vertical plate between the vertical plate and the lining plate guide frame, and the other steel wire rope shock absorber is horizontally arranged between the horizontal plate and the bottom of the lining plate guide frame.

5. The large-tonnage coal dropping buffer skip for the mine according to claim 1, wherein inwards concave guide sliding grooves are formed in two sides of a front of the lining plate guide frame, and the guide sliding grooves are configured to provide rails for upward and downward movement of the lining plate support.

6. The large-tonnage coal dropping buffer skip for the mine according to claim 1, wherein the lining plate support comprises an L-shaped structural plate and an upper horizontal plate at an upper part of the L-shaped structural plate, and a plurality of first threaded holes are formed in the upper horizontal plate at equal intervals;
- second threaded holes are formed in a top end of the lining plate at positions corresponding to the first threaded holes in the upper horizontal plate;
- the fasteners are bolts, and thread ends of the bolts sequentially penetrate through the first threaded holes and the second threaded holes to fixedly connect the lining plate and the lining plate support.

7. The large-tonnage coal dropping buffer skip for the mine according to claim 6, wherein compression springs for preventing loosening are inserted between a nut ends of the bolts and the upper horizontal plate of the lining plate support.

* * * * *